(12) United States Patent
Hasegawa

(10) Patent No.: US 9,364,909 B2
(45) Date of Patent: Jun. 14, 2016

(54) WIRE ELECTRIC DISCHARGE MACHINE AND WIRE ELECTRIC DISCHARGE MACHINING METHOD

(71) Applicant: FANUC CORPORATION, Minamitsuru-gun, Yamanashi (JP)

(72) Inventor: Yasuo Hasegawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 457 days.

(21) Appl. No.: 14/050,110

(22) Filed: Oct. 9, 2013

(65) Prior Publication Data

US 2014/0103014 A1    Apr. 17, 2014

(30) Foreign Application Priority Data

Oct. 11, 2012   (JP) .................. 2012-226384

(51) Int. Cl.
*B23H 1/02*    (2006.01)
*B23H 7/08*    (2006.01)
*B23H 7/04*    (2006.01)

(52) U.S. Cl.
CPC .................. *B23H 1/022* (2013.01); *B23H 7/04* (2013.01); *B23H 7/08* (2013.01); *B23H 1/02* (2013.01); *B23H 2200/00* (2013.01)

(58) Field of Classification Search
CPC .......... B23H 7/104; B23H 1/02; B23H 7/065; B23H 7/06; B23H 7/20; B23H 2500/20; B23H 7/04; B23H 1/00; B23H 11/003; B23H 7/08; B23H 1/022; B23H 2200/00; G05B 19/4086; G05B 2219/33263
USPC .......... 219/69.12, 69.13, 69.14, 69.15, 69.16, 219/69.17, 69.18, 69.19, 69.2
See application file for complete search history.

(56) References Cited

U.S. PATENT DOCUMENTS 6,130,510 A    10/2000   Kurihara et al.

FOREIGN PATENT DOCUMENTS

| JP | 7-237039 A | 9/1995 |
|---|---|---|
| JP | 11-48039 A | 2/1999 |
| JP | 2008-260070 A | 10/2008 |

OTHER PUBLICATIONS

Office Action mailed Jan. 27, 2015, corresponding to Japanese patent application No. 2012-226384.

*Primary Examiner* — Eric Stapleton
(74) *Attorney, Agent, or Firm* — Hauptman Ham, LLP

(57) ABSTRACT

In carrying out electric discharge machining of a graphite or carbon-composite workpiece by a wire electric discharge machine, a voltage lower than that used in machining a metal workpiece by the wire electric discharge machine is supplied to a machining gap. Further, the peak value and the pulse width of a total discharge current flowing from a power supply device for electric discharge machining to a wire electrode are adjusted within ranges of 30 to 150 amperes and 0.3 to 6.4 microseconds, respectively.

5 Claims, 17 Drawing Sheets

<MACHINED SURFACE ROUGHNESS UNDER
CONVENTIONAL CONDITIONS 75 μmRz>

<MACHINED SURFACE ROUGHNESS UNDER
CONDITIONS OF THE INVENTION 6 μmRz>

RELATIONSHIP BETWEEN ON-TIME AND SUPPLY VOLTAGE
WITH PEAK CURRENT VALUE AT 100 A

WALL PORTION
SPEED-ORIENTED

THIN RIB PORTION
ESPECIALLY LOW PEAK
CURRENT

SHARP EDGE PORTION
ESPECIALLY LOW PEAK
CURRENT

WIRE ELECTRIC DISCHARGE MACHINE AND WIRE ELECTRIC DISCHARGE MACHINING METHOD

RELATED APPLICATIONS

The present application is based on, and claims priority from, Japanese Application No. 2012-226384, filed Oct. 11, 2012, the disclosure of which is hereby incorporated by reference herein in its entirety.

BACKGROUND OF THE INVENTION

1. Field of the Invention

The present invention relates to a wire electric discharge machine configured to machine a workpiece with a voltage applied between the workpiece and a wire electrode, and more particularly, to a wire electric discharge machine and a wire electric discharge machining method, configured to machine a graphite or carbon-composite workpiece.

2. Description of the Related Art

Since graphite and carbon-composite materials are light in weight and excellent in electrical conductivity, heat-resisting property, thermal conductivity, and lubricity, they are frequently used for electrodes for electric discharge machining, slide bearings, etc. In cutting work for cutting a desired shape, a tool wears quickly and chips cannot be easily removed.

In the cutting work, as shown in FIGS. 1A and 1B and FIGS. 2A and 2B, a number of necessary shapes are very difficult to machine. Recently, wire electric discharge machining has been becoming noticeable as a method to machine those awkward shapes for cutting. FIGS. 1A and 1B are plan and perspective views, respectively, showing a machining shape with a rib width of 0.5 mm and plate thickness of 200 mm. On the other hand, FIGS. 2A and 2B are plan and perspective views, respectively, showing a machining shape with a rib width of 0.5 mm and plate thickness of 200 mm.

Generally, in wire electric discharge machining, a sharp current pulse with a high peak current value and short pulse width is used in rough machining of a workpiece by a wire electric discharge machine, as disclosed in Japanese Patent Application Laid-Open No. 11-48039. FIG. 3 shows a current pulse with a sharp leading edge. In this case, the machining supply voltage of the machine is so high that the normal peak current value used for machining ranges from about 300 to 1,000 amperes and the pulse width is about 0.5 microsecond.

Conventionally, however, it is difficult to efficiently quickly machine a brittle graphite or carbon-composite material into the thin rib-like shapes shown in FIGS. 1A to 2B with good surface quality by using a current pulse with a peak value of 300 to 1,000 amperes and a width of 0.5 microsecond.

If the current pulse for rough machining used in Japanese Patent Application Laid-Open No. 11-48039 is applied to machining of a porous, brittle graphite material, large fragments of about 0.2 mm are inevitably produced, as shown in FIG. 4, so that products with good surface quality cannot be obtained. FIG. 4 shows a machined surface photo 100 of the graphite material under conventional conditions. FIG. 5 is a graph showing machined surface roughness 104 on line 102-102 of FIG. 4.

In the case where the thin rib-like shapes are machined by the conventional wire electric discharge machine, as shown in FIGS. 1A to 2B, rib portions are inevitably damaged, as in machining examples shown in FIGS. 6A and 6B, so that a desired machining shape cannot be obtained. FIGS. 6A and 6B show a crack 107 of a thin rib 106 and a fragment 111 of a thin rib 110, respectively.

FIG. 6A shows how a wire electrode 1 is moved relative to the thin rib 106 in the direction of an arrow 108, thereby machining the reverse surface of the rib 106, and is then moved relative to the rib 106 in the direction of an arrow 109, thereby machining the obverse surface of the rib 106. Likewise, FIG. 6B shows how the wire electrode 1 is moved relative to the thin rib 110 in the direction of an arrow 112, thereby machining the reverse surface of the rib 110, and is then moved relative to the rib 110 in the direction of an arrow 113, thereby machining the obverse surface of the rib 110.

As disclosed in Japanese Patent Application Laid-Open No. 2008-260070, the defective part (the crack 107 or fragment 111 of the thin rib shown in FIG. 6A or 6B) may be repaired by a second-cut method. If the thin rib is damaged, however, it cannot be repaired by this second-cut method. Further, many of workpieces with thin rib-like shapes may be warped during rough machining so that rough-machined shapes are distorted. It is often difficult to correct the distortion in the machining by the second-cut method. Therefore, a method is used in which machining work is finished when rough machining is completed.

In machining the graphite material, moreover, graphite is sublimated by the heat of electric discharge to produce a lot of gas during the machining. Thus, in machining a workpiece formed of a thick graphite plate, in particular, the gas produced in the area of electric discharge reduces the effect of cooling of machining parts, especially the wire electrode, by a working fluid. In addition, there is a problem that the wire electrode is thermally fused to cause a wire breakage, which prevents continuation of the machining.

SUMMARY OF THE INVENTION

Accordingly, the object of the present invention is to provide a wire electric discharge machine, configured to machine a graphite or carbon-composite material having good surface roughness and free from damage and chipping despite a complicated thin rib-like shape, while maintaining a machining speed for the material, and a wire electric discharge machining method for machining a graphite or carbon-composite workpiece.

A wire electric discharge machine according to the present invention is configured to apply a pulse voltage to a machining gap between a wire electrode and a workpiece so that the workpiece is machined by electric discharge. The wire electric discharge machine comprises a power supply device for electric discharge machining, capable of applying a voltage lower than a voltage for metal material machining to the machining gap, and a controller configured to adjust a pulse voltage supplied from the power supply device for electric discharge machining to the machining gap and the pulse width of the pulse voltage so that a peak value and a pulse width of a total discharge current flowing to the wire electrode is suitable for machining of the material of the workpiece if the material is graphite or a carbon composite.

The power supply device for electric discharge machining may be configured to change the peak value and the pulse width of the total discharge current flowing to the wire electrode within ranges of 30 to 150 amperes and 0.3 to 6.4 microseconds, respectively, the wire electric discharge machine may further comprise material-type input means for inputting the type of the workpiece material, and the controller may be configured to adjust the peak value and the pulse width of the total discharge current flowing to the wire electrode within changeable ranges for the peak current value and the current pulse width of the power supply device for electric discharge machining if the material of the type input by the material-type input means is graphite or a carbon composite.

The power supply device for electric discharge machining may comprise a plurality of DC power supply devices configured to change a peak current value within the range of 30 to 150 amperes, switching means for changing the plurality of DC power supply devices in response to a command from the controller, and current supply means for supplying the discharge current from the DC power supply device changed in response to the command from the controller to the machining gap for a time commanded by the controller.

In a wire electric discharge machining method according to the present invention, a graphite or carbon-composite workpiece is machined by a wire electric discharge machine configured to apply a voltage to a machining gap between the workpiece and a wire electrode.

According to a first aspect of the wire electric discharge machining method of the invention, the workpiece is machined with a peak value and a pulse width of a total discharge current flowing to the wire electrode adjusted within ranges of 30 to 150 amperes and 0.3 to 6.4 microseconds, respectively.

According to a second aspect of the wire electric discharge machining method of the invention, the workpiece is machined in such a manner that the time required for the attainment of 90 amperes by a total discharge current flowing to the wire electrode after the start of supply is 1.0 microsecond or more and that a peak current value ranges from 90 to 110 amperes.

According to a third aspect of the wire electric discharge machining method of the invention, the workpiece is machined in such a manner that the time required for the attainment of 40 amperes by a total discharge current flowing to the wire electrode after the start of supply is 1.0 microsecond or more and that a peak current value ranges from 40 to 70 amperes when a thin rib-like shape with a rib width of 0.4 mm or less is to be machined.

According to the present invention, there may be provided a wire electric discharge machine, configured to machine a graphite or carbon-composite material having good surface roughness and free from damage and chipping despite a complicated thin rib-like shape, while maintaining a machining speed for the material, and a wire electric discharge machining method for machining a graphite or carbon-composite workpiece.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

<Machining Principle of the Invention>

Figure 7:
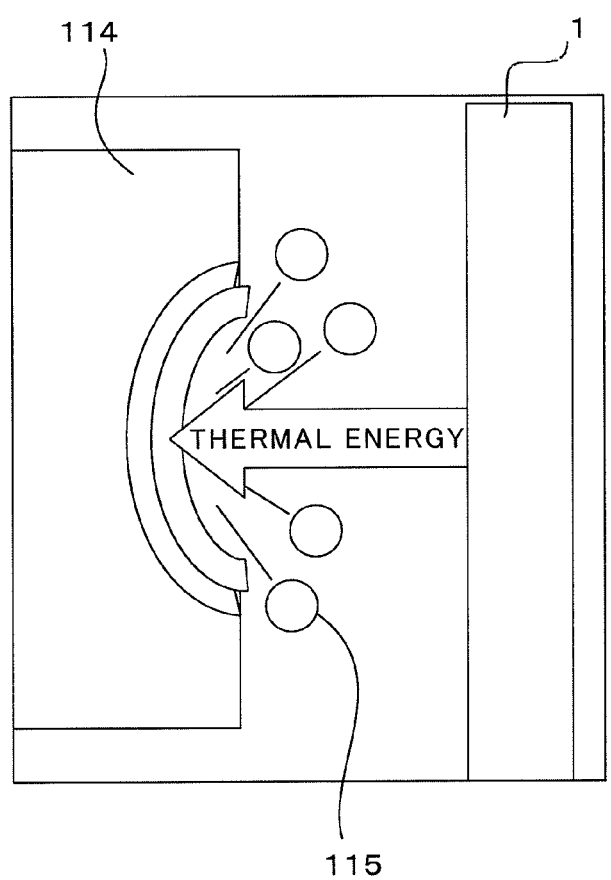
FIG. 7 is a diagram illustrating how a metal workpiece is machined by wire electric discharge machining.
Figure 6A:
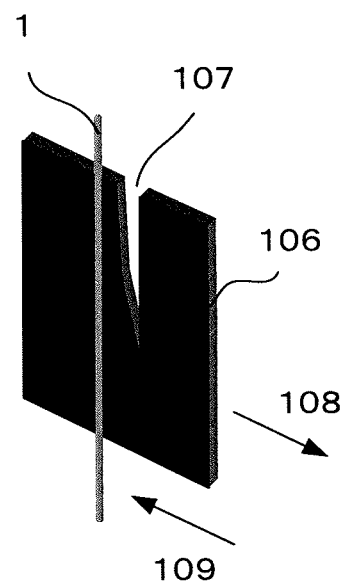
FIG. 6A is a diagram illustrating how a thin rib cracks when its surface is machined by moving a wire electrode relative to it.
Figure 6B:
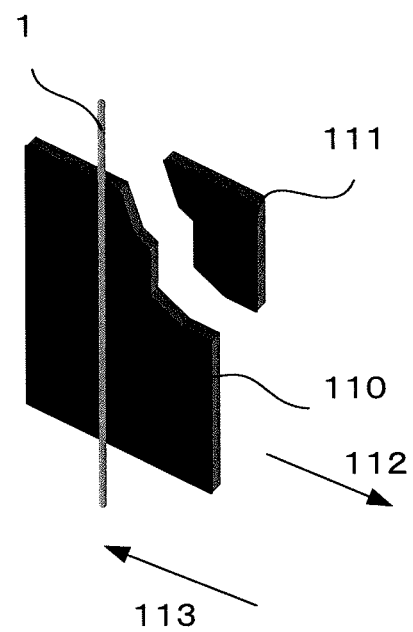
FIG. 6B is a diagram illustrating how the thin rib chips are produced when its surface is machined by moving the wire electrode relative to it.

In processes for wire electric discharge machining, a discharge current is passed between a wire electrode 1 and a workpiece 114 to be machined so that the surface of the workpiece in an electric discharge area is melted by heat produced by the discharge current. At the same time, a working fluid surrounding the wire electrode is subjected to a vapor explosion. The molten material is blown off and removed. These processes are repeated at high speed. Then, the material (molten metal powder 115) around the wire electrode 1 is removed, and the workpiece 114 is fluted into a desired shape (FIG. 7) by moving the relative positions of the wire electrode 1 with respect to the workpiece around a machining route. Thus, even a hard metal material can be machined or cut by means of a brass wire without using a high-hardness tool. If the workpiece 114 is made of a metal material, in contrast with a graphite material, severe piercing of the machined surface or chipping of rib portions cannot be caused by the melting and explosive removal of the electric discharge area alone.

Figure 8:
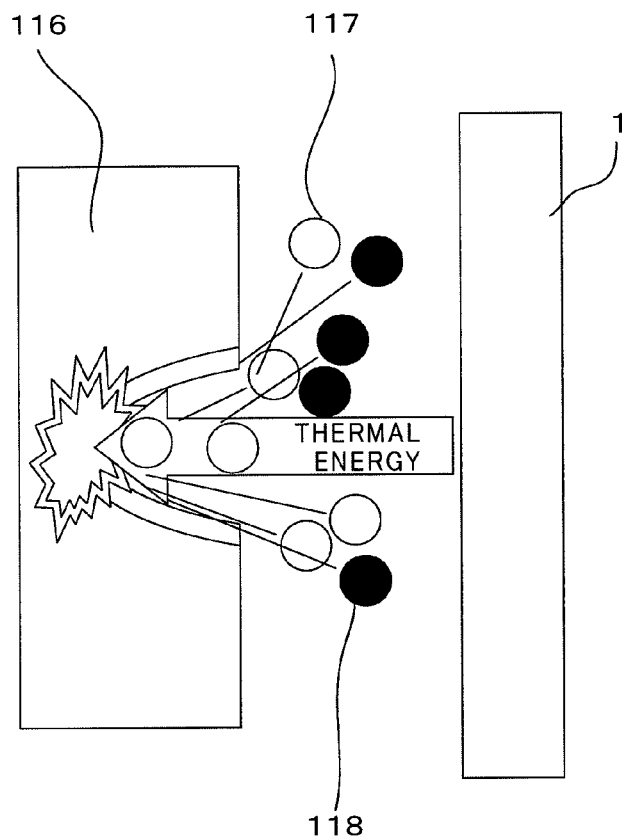
FIG. 8 is a diagram illustrating the principle on which graphite cracks when a graphite workpiece is machined by wire electric discharge machining.

It was found, however, that if a workpiece of a graphite material, which has high thermal conductivity, porosity, and high brittleness, is subjected to electric discharge machining, graphite in the machined surface is thermally sublimated or vaporized in the electric discharge area. Further, intense heat is instantaneously transferred to the working fluid in the material, thereby easily vaporizing the fluid (that boils at 100° C.) in the material. Thereupon, the material is inevitably broken by an internal vapor explosion (FIG. 8).

Figure 3:
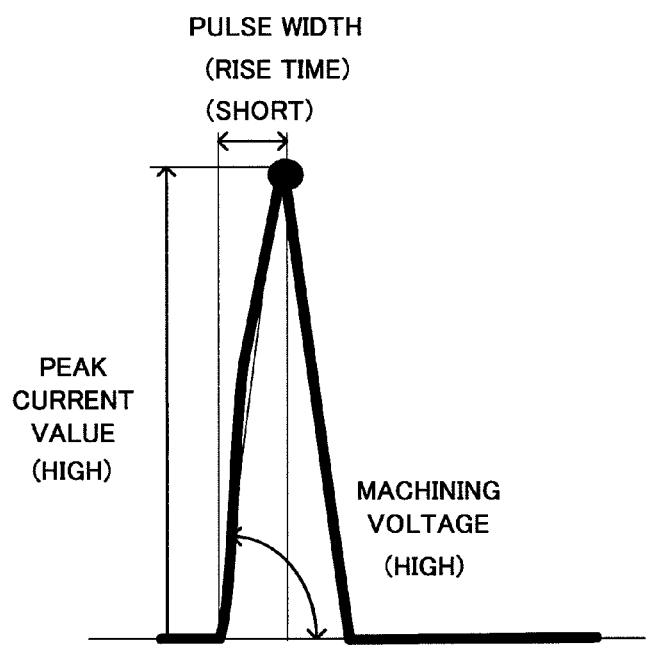
FIG. 3 is a diagram illustrating a conventional graphite machining current waveform.

It was experimentally revealed that the energy of the vapor explosion in the material by the electric discharge has relation to the peak value of discharge current pulses and the time required for attainment of the peak value. In the case of a current pulse waveform with a sharp leading edge and high peak current shown in FIG. 3, graphite 116 is deeply sublimated in a form similar to the current pulse waveform, in a narrow range of the machined surface, as shown in the electric discharge principle diagram of FIG. 8. Further, the working fluid that is introduced to a depth of about 0.5 mm from the surface of the highly conductive, porous material is heated to a high temperature and subjected to an internal vapor explosion. Thereupon, air bubbles 117 are produced to cause piercing of the machined surface, production of thin rib-like fragments 118, or damage.

Figure 9:
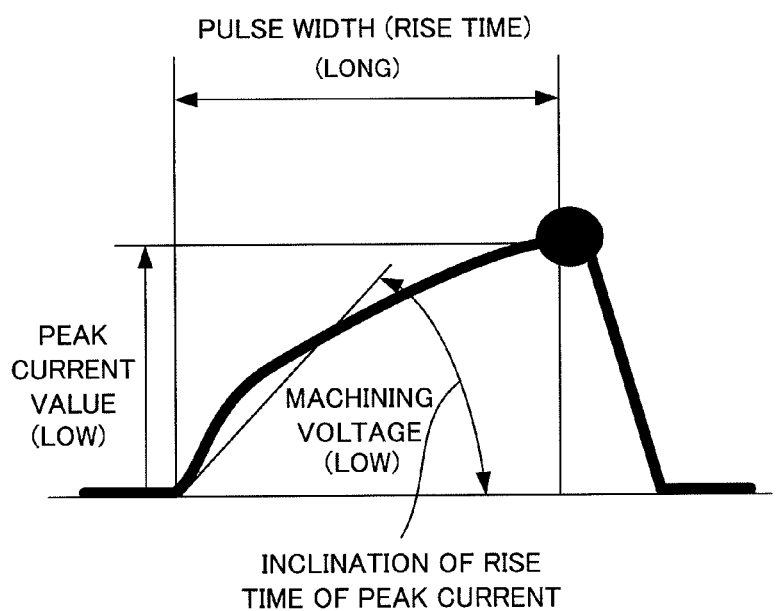
FIG. 9 is a diagram illustrating a waveform of a current pulse supplied between the wire electrode and a graphite or carbon-composite workpiece.
Figure 10:
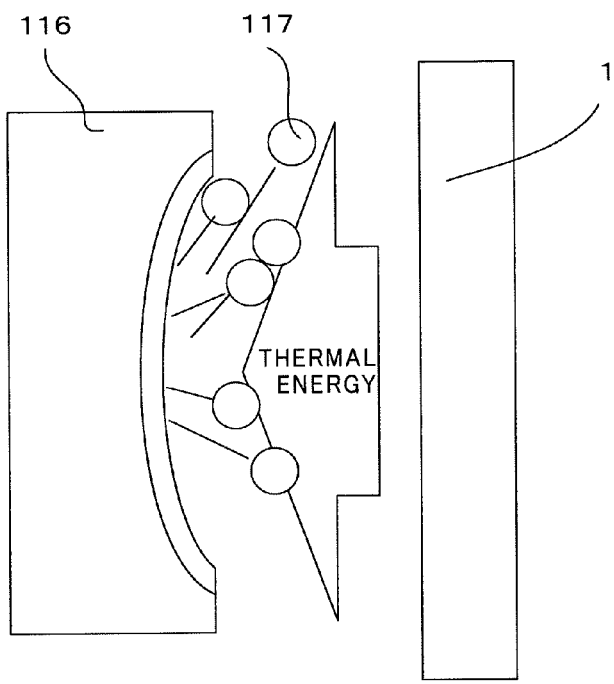
FIG. 10 is a diagram illustrating the principle on which graphite does not cracks during electric discharge machining.

Thereupon, as shown in FIG. 9, a current pulse waveform is used between a machining gap between the wire electrode 1 and the graphite or carbon-composite workpiece such that the leading edge of a machining current is gentle, the peak current is lower, and instead, the current pulse width is long. By doing this, as shown in the electric discharge principle diagram of FIG. 10, a wide range of the machined surface can continue to be heated to sublimate or burn the graphite 116 shallowly and widely by electric discharge with a pattern similar to the current pulse waveform without subjecting the working fluid inside to a vapor explosion. Thus, a smooth machined surface and even a thin rib-like shape free from damage and chipping were able to be obtained without greatly reducing the machining efficiency.

<Configuration of Wire Electric Discharge Machine Body>

Figure 11:
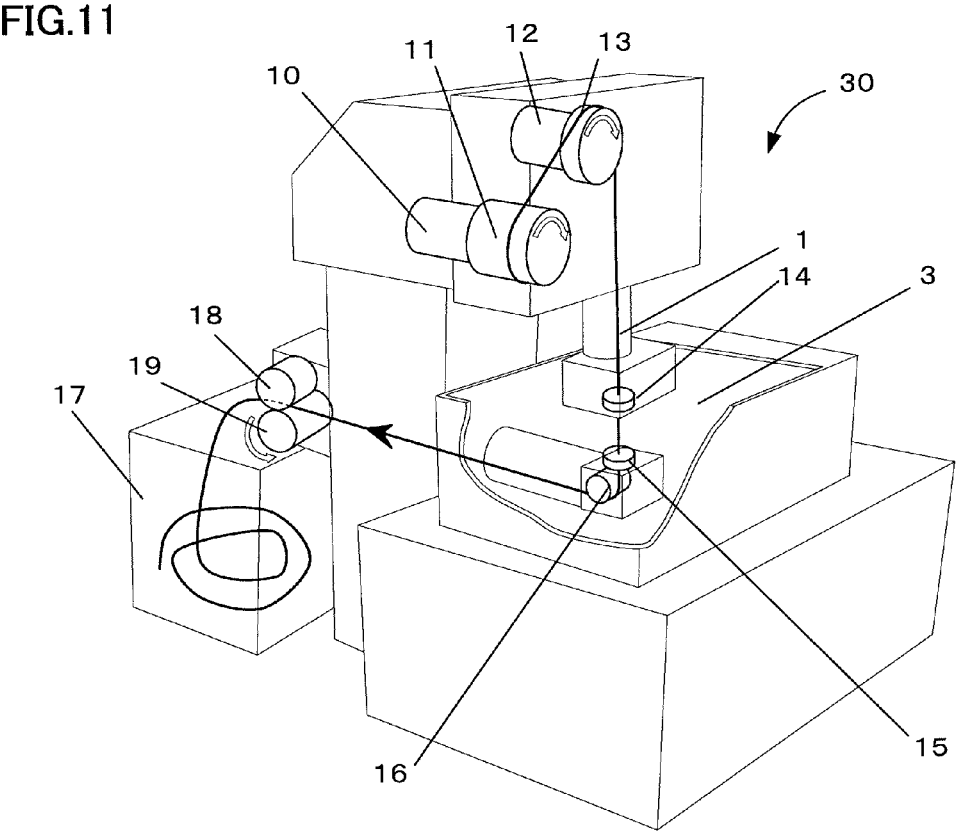
FIG. 11 is a diagram illustrating an outline of a wire electric discharge machine.

FIG. 11 is a schematic diagram of a wire electric discharge machine body 30 to which the present invention is applied.

A wire bobbin 11 around which wire electrode 1 is wound is given a predetermined low torque by a delivery unit torque motor 10. This torque is commanded opposite the lead-out direction of the wire electrode 1. The wire electrode 1 delivered from the wire bobbin 11 is passed through a plurality of guide rollers (not shown), and its tension between a brake shoe 13, which is driven by a brake motor 12, and a feed roller 19, which is driven by a wire electrode feed motor (not shown), is adjusted by the brake shoe 13.

The wire electrode 1 passed through the brake shoe 13 is recovered into a wire collection box 17 via an upper wire guide 14, lower wire guide 15, and lower guide roller 16 in such a manner that it is held between a pinch roller 18 and the feed roller 19, which is driven by the wire electrode feed motor (not shown). A graphite or carbon-composite workpiece 2 (not shown) is placed on a table (not shown) and disposed between the upper and lower wire guides 14 and 15 in a working tank 3. Electric discharge machining is performed by relatively moving the wire electrode 1 with respect to the workpiece 2.

Figure 12:
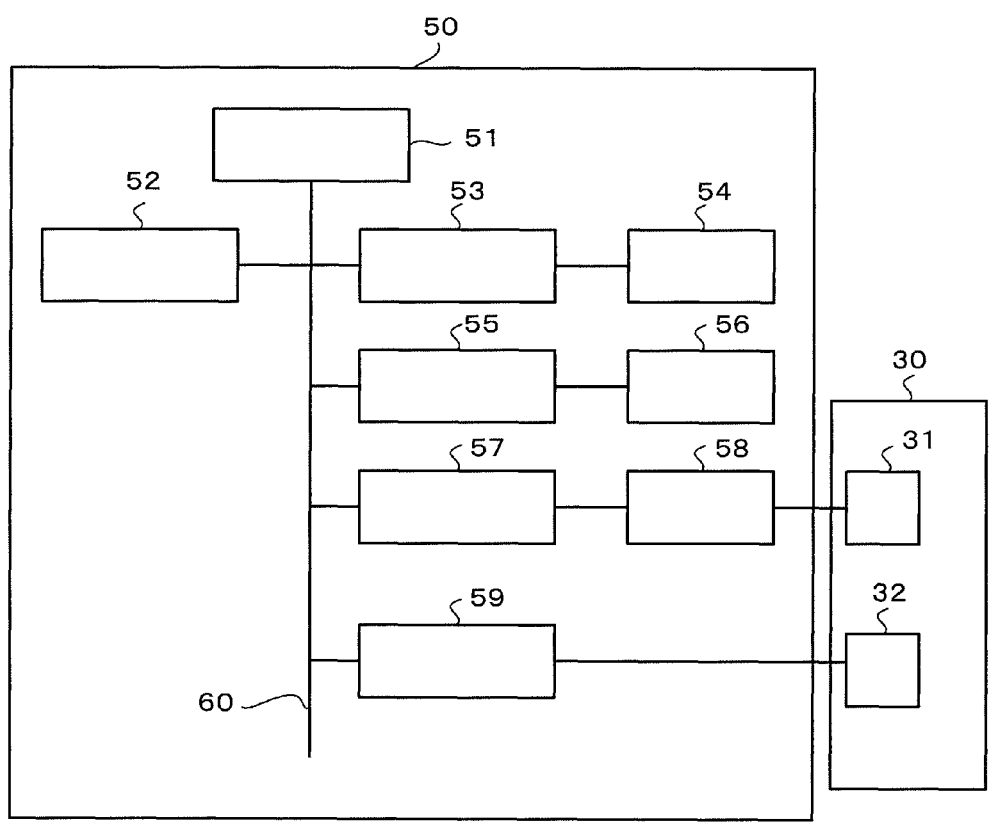
FIG. 12 is a block diagram illustrating a controller of the wire electric discharge machine.

A controller 50 for controlling the wire electric discharge machine body 30 will be described with reference to FIG. 12.

The controller 50 comprises a processor (CPU) 51, memory 52 including a RAM, ROM, etc., display interface 53, display device 54, keyboard interface 55, keyboard 56, servo interface 57, and servo amplifier 58, which are connected to the processor 51 by a bus 60. The wire electric discharge machine body 30 also comprises a machining power supply device. In one embodiment of an electric discharge machine according to the present invention, data on the material of the workpiece to be machined can be input by means of, for example, the keyboard 56 and stored in the memory 52. If the material of the workpiece stored in the memory 52 is graphite or a carbon composite, a machining power supply device 20 (FIG. 13) is controlled so that machining of the graphite or carbon composite is performed by a wire electric discharge machining method according to the present invention.

A servomotor 31 for each axis of the wire electric discharge machine body 30 is driven by a servo amplifier 58. The wire electric discharge machine body 30 comprising the machining power supply device 20 is controlled through an interface 59. If machining of the workpiece 2 is started by executing a machining program, commands for opening or closing supply-voltage changeover switches and a current supply switch are also output to a supply-voltage switching circuit 32, which controls the machining power supply device 20 through the interface 59.

<Machining Power Supply Device>

Figure 13:
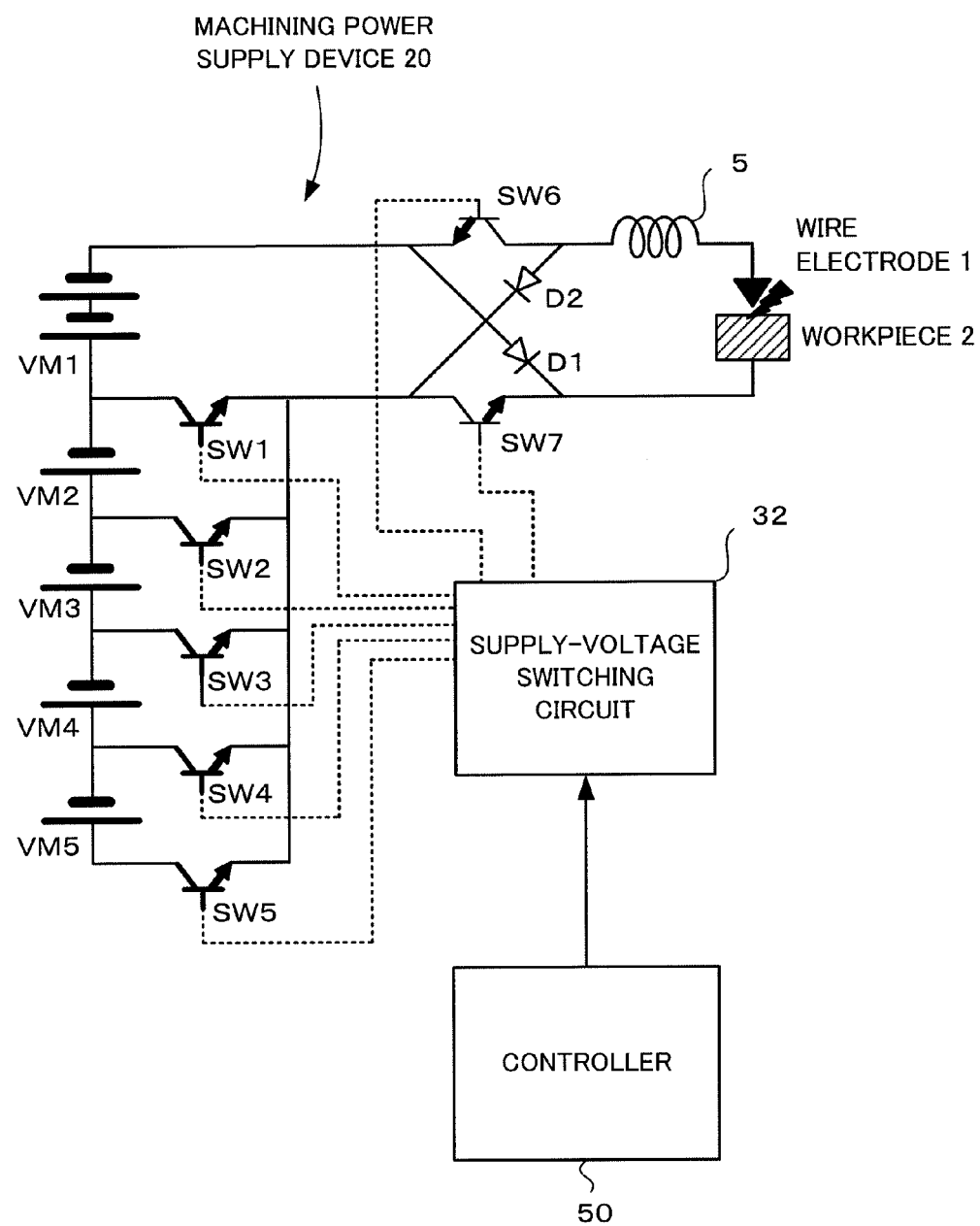
FIG. 13 is a diagram illustrating a machining power supply device.

An example of the machining power supply device 20 for creating a current waveform according to the present invention will be described with reference to FIG. 13.

In subjecting a graphite or carbon-composite workpiece to wire electric discharge machining, the machining power supply device 20 sets the voltage to be applied to the machining gap lower than that used in machining a metal material. The machining power supply device 20 constitutes a discharge circuit, which comprises DC power supplies VM1 to VM5, supply-voltage changeover switches SW1 to SW5, switching elements SW6 and SW7, and the supply-voltage switching circuit 32. The DC power supplies VM1 to VM5 are discharge power supplies that supply discharge current to the machining gap between the wire electrode 1 and the workpiece 2. The switching elements SW6 and SW7 serve to supply discharge current to the machining gap. The supply-voltage switching circuit 32 performs on/off control of the supply-voltage changeover switches SW1 to SW5 and the switching elements SW6 and SW7 in response to commands from the controller 50. In the description to follow, the switches SW1 to SW7 will be referred to as first to seventh switches, respectively.

In the discharge circuit of the machining power supply device 20, a diode D1 is connected in a direction from, for example, one electrode terminal of each discharge power supply VMn (n=1 to 5) to the grounding terminal of the workpiece 2, and a diode D2 is connected in a direction from the machining wire electrode 1 to the other electrode terminal of the discharge power supply VMn, thereby forming a crossover power supply. The sixth and seventh switching elements SW6 and SW7 are opened and closed in response to commands from the controller 50. A coil 5 is an element for storing inductive energy.

The rate of rise of the discharge current can be changed by only preparing a plurality of discharge power supplies VM1 to VM5 and changing the first to fifth changeover switches SW1 to SW5 corresponding thereto. For example, the voltage of the first power supply VM1 can be set to 40 volts, and those of the second to fifth power supplies VM2 to VM5 to 20 volts, individually. If the first switch SW1 is turned on, the voltage of the first power supply VM1 of 40 volts is selected as a machining supply voltage. If the second switch SW2 is turned on, a voltage of 60 volts, which is the sum of the respective voltages of the first and second discharge power supplies VM1 and VM2, is used as the machining supply voltage. The same result can be obtained for the other switches. For the pulse width required for the attainment of the peak value of the discharge current, it is necessary only that the sixth and seventh switching elements SW6 and SW7, which are on-time switches (current supply switches) of a power supply circuit, be connected for a time equivalent to a set pulse width.

An example of current waveform change observed when the supply voltage is changed will be described with reference to FIG. 14D.

Figure 14:
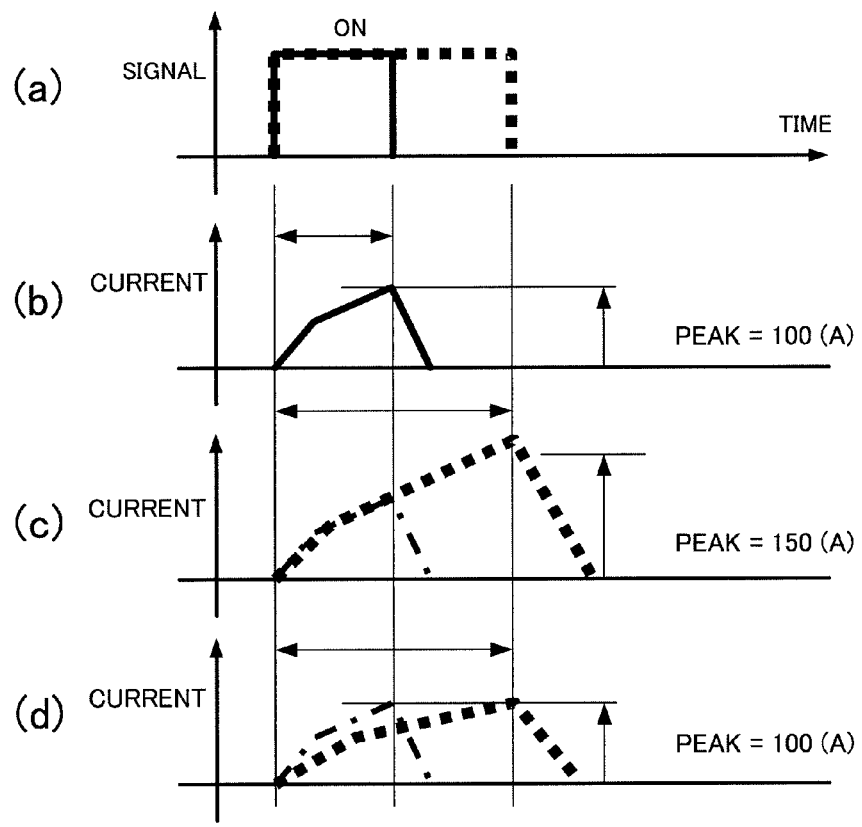
FIG. 14 is diagram illustrating how the current waveform changes when a plurality of supply voltages that constitute the machining power supply device of FIG. 13 are changed.

The current supply switches (SW6 and SW7) are on/off-controlled by a signal shown in (a) in FIG. 14.

As shown in (b) in FIG. 14, the peak current value is 100 amperes if the on-time of the current supply switches SW6 and SW7 is 1.0 microsecond with the supply voltage (VM4) of 100 volts.

As shown in (c) in FIG. 14, the peak current value is 150 amperes if the on-time of the current supply switches SW6 and SW7 is 2.0 microseconds with the supply voltage (VM4) of 100 volts.

As shown in (d) in FIG. 14, the peak current value is 100 amperes if the on-time of the current supply switches SW6 and SW7 is 2.0 microseconds with the supply voltage (VM2) of 60 volts.

In order to change the rate of rise of the discharge current, as shown in (a) to (d) in FIG. 14, it is necessary only that the DC power supplies VM1 to VM5 and their corresponding changeover switches SW1 to SW5 be changed. As shown in (a) to (d) in FIG. 14, the discharge current reaches the peak current value when the current supply switches SW6 and SW7 are switched from on to off. As shown in FIG. 9, the pulse width is the time length of an interval during which the discharge current rises and reaches the peak current value.

<Embodiment>

The following is a description of an embodiment in which graphite is machined by using the wire electric discharge machine (or the wire electric discharge machine body 30 controlled by the controller 50).

(1) The graphite workpiece 2 is fixed on a table (not shown) in the working tank 3 of the wire electric discharge machine body 30 directly or by means of a fixing jig (not shown).

(2) Among other machining conditions, the discharge current pulse waveform, which influences the surface quality, cracking, and chipping of the workpiece, is set so that the peak current value ranges from, for example, 30 to 150 amperes, the current pulse width ranges from 0.3 to 6.4 microseconds, and no chipping occurs in connection with the current surface roughness and minimum rib width, and the quiescent time is finally extended to such a degree that no wire breakage occurs.

(3) The peak current value is the maximum attainable value of the discharge current, which corresponds to the apex of a triangular waveform shown in FIG. 9.

(4) The current pulse width indicates the time elapsed from the start of current supply to the machining gap between the wire electrode 1 and the workpiece 2 with the current supply switches SW6 and SW7 of the machining power supply device 20 on until the peak current value is reached. Actually, the current will not increase any more if the switches SW6 and SW7 are turned off. Therefore, the peak current value can be considered to be reached at this point in time.

(5) In a specific example where the machining condition is determined in the process (2), the supply voltage is set as low as possible, the on-time of the power supply circuit is previously set so low that the current does not exceed a desired peak current value during electric discharge, and the on-time is gradually extended so that the desired peak current value is approached.

(6) After the result of this machining is observed to ascertain that the workpiece is free from damage, chipping, and piercing, the supply voltage is switched to the second highest setting and the process (5) is repeated, in order to increase the machining speed.

(7) In the machining power supply device of the present embodiment (FIG. 13), for example, the peak current value can be adjusted to 30 to 150 amperes by setting the supply voltage for machining to about 30 to 150 volts.

(8) The peak current value and the pulse width can be determined depending on the plate thickness, material (brittleness and compactness), machining shape (rib width), and desired surface roughness of the graphite or carbon-composite workpiece.

(9) Naturally, the smaller the peak current value, the better the surface roughness is. As the peak current value becomes smaller, however, the machining speed is extremely reduced. In order to machine a workpiece with, for example, a plate thickness of 150 mm and rib width of 0.6 mm, therefore, a peak current value of 100 amperes and a pulse width of about 1.2 microseconds are optimal settings at which the surface roughness and machining speed are compatible with each other.

(10) In a machining example, wire breakages used to frequently occur at a machining speed of 0.4 mm/min under conventional conditions. According to the embodiment of the present invention, in contrast, machining was able to be continued to the last at a speed of 0.35 mm/min without a wire breakage.

(11) Further, the result of machining of a shape with a small rib width indicates that in order to machine a workpiece with a plate thickness of 150 mm and rib width of 0.3 mm, a peak current value of 50 amperes and a pulse width of about 1.2 microseconds are optimal settings at which the surface roughness and machining speed are compatible with each other.

<Effect of the Invention>

Figure 1A:
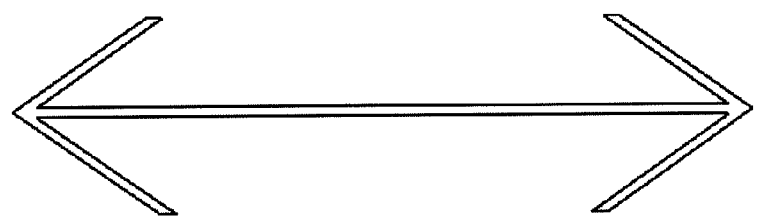
FIG. 1A is a plan view showing a machining shape example 1.
Figure 1B:
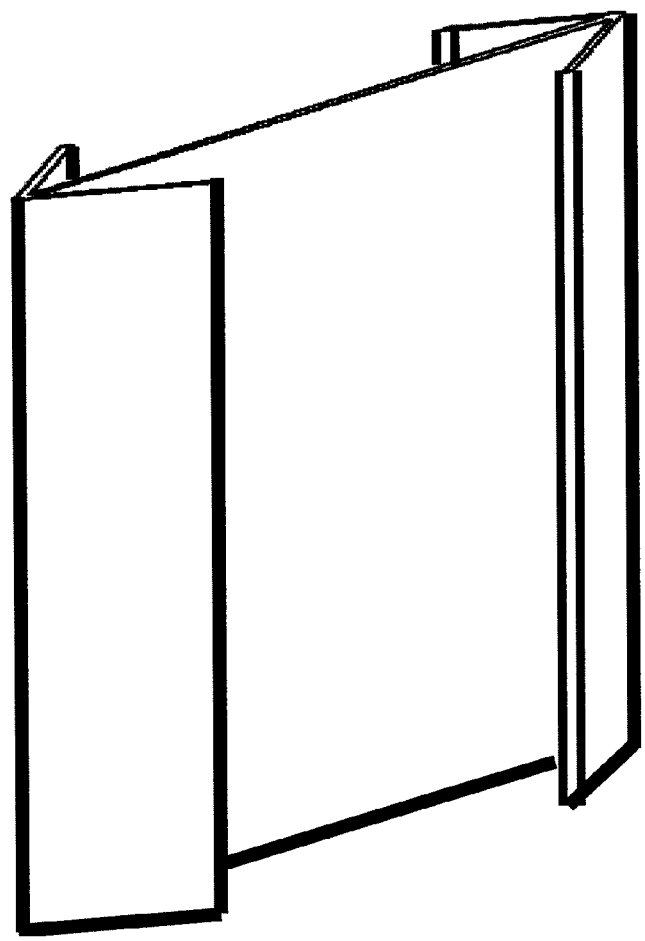
FIG. 1B is a perspective view showing the machining shape example 1 of FIG. 1A.
Figure 2A:
FIG. 2A is a plan view showing a machining shape example 2.
Figure 2B:
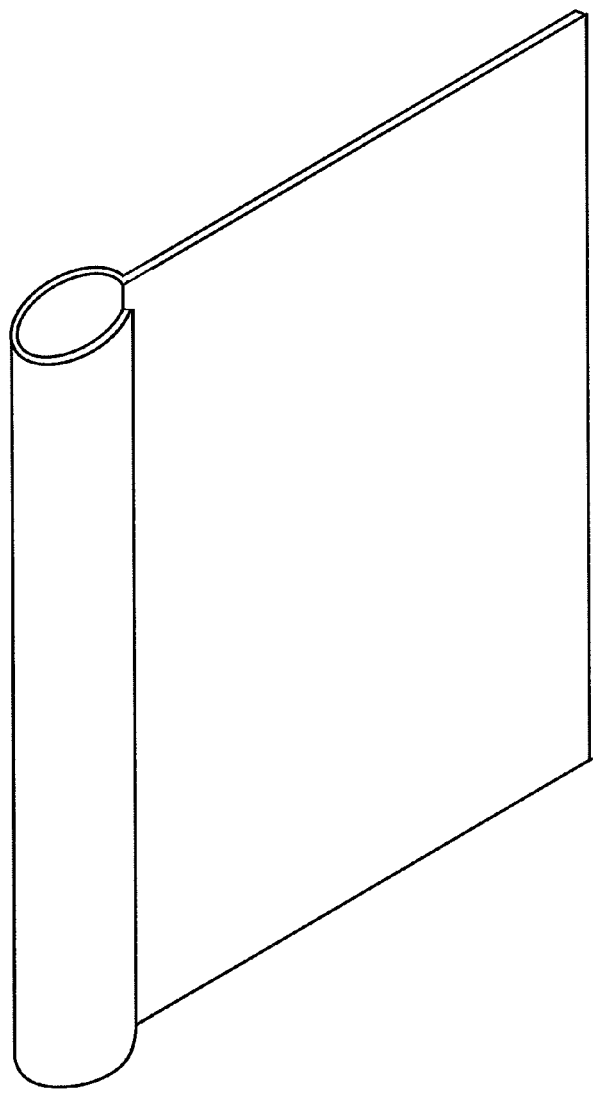
FIG. 2B is a perspective view showing the machining shape example 2 of FIG. 2A.
Figure 4:
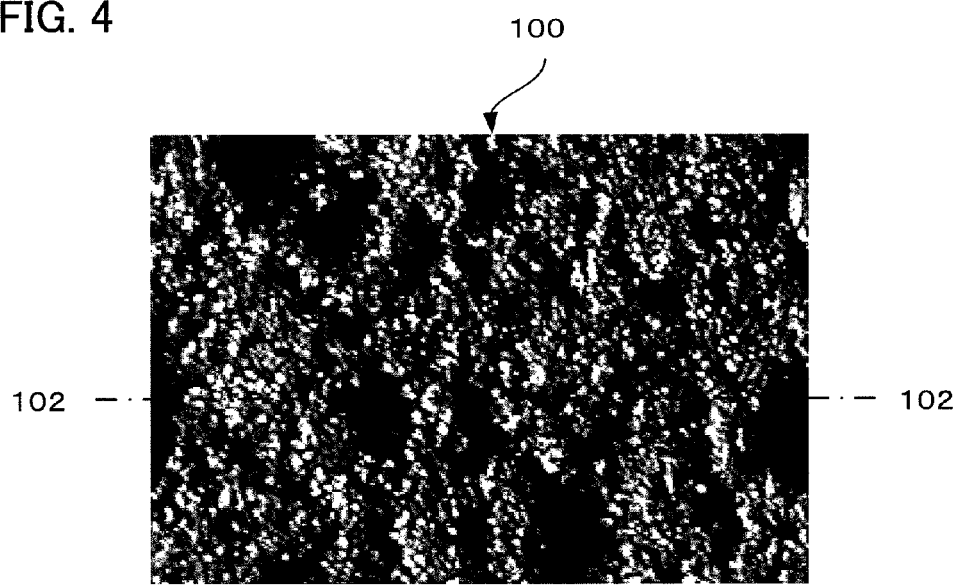
FIG. 4 is a photo of a machined graphite surface under conventional conditions.
Figure 5:
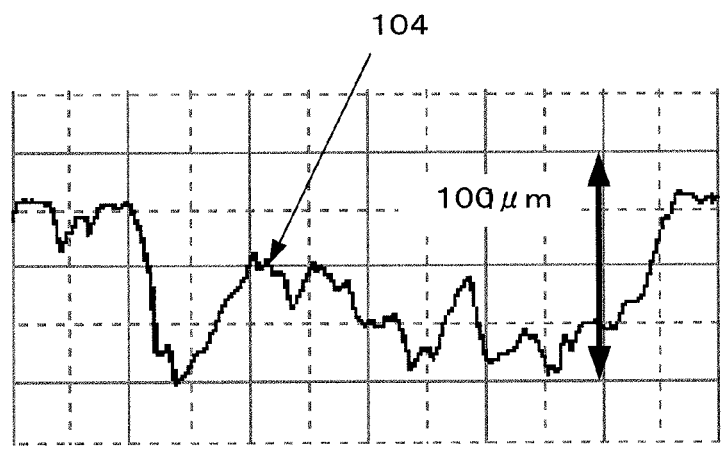
FIG. 5 is a graph showing machined surface roughness on line 102-102 of FIG. 4.
Figure 15:
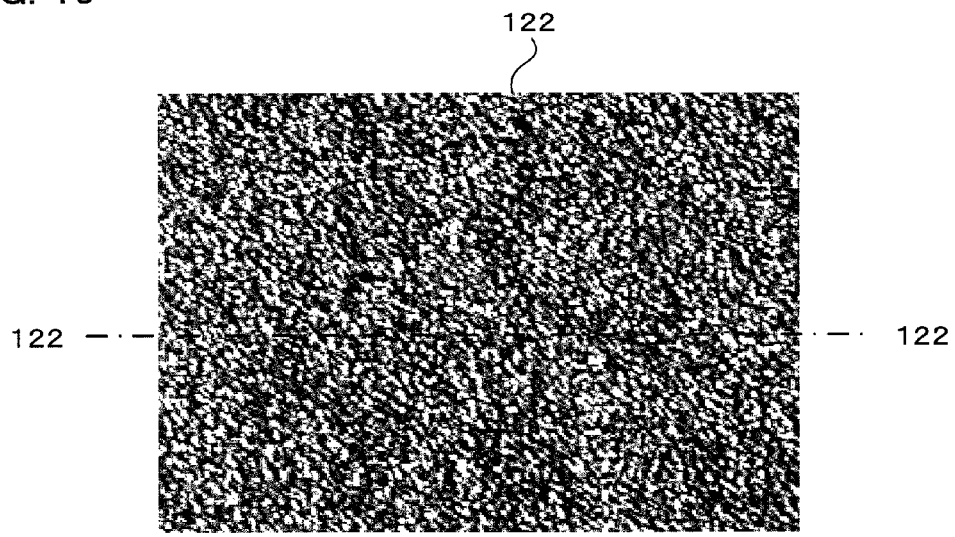
FIG. 15 is a photo of a machined surface machined by the wire electric discharge machine according to the present invention.
Figure 16:
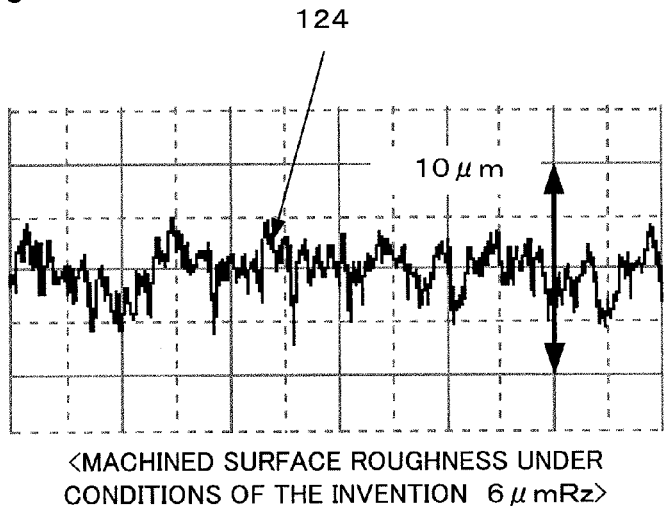
FIG. 16 is a graph showing the roughness of the machined surface machined by the wire electric discharge machine of the present invention.

According to the present invention, the shapes of FIGS. 1 and 2, which have been considered to be unable to be easily machined by a conventional wire electric discharge machine, can be quickly machined with high quality. FIGS. 4 and 5 are an enlarged photo of a conventional machined surface and a graph illustrating its roughness, respectively. FIGS. 15 and 16 are an enlarged photo of a machined surface according to the present invention and a graph illustrating its roughness, respectively. A considerable improvement was able to be ascertained.

Figure 17:
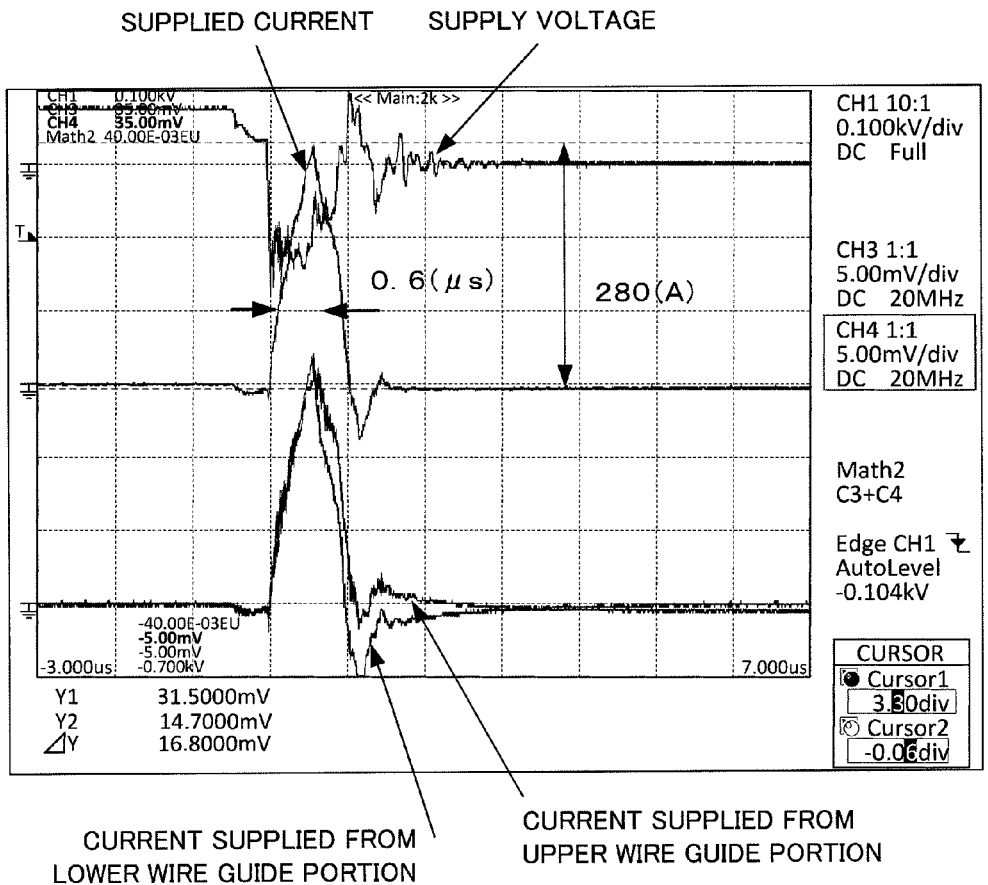
FIG. 17 is a diagram illustrating a conventional current waveform (peak current waveform) based on conventional machining condition setting.

In conventional machining condition setting, the peak current waveform suddenly rises up to 280 amperes in 0.6 microsecond, as shown in FIG. 17. This shocking current flow overheats even a deep part of a workpiece including a working fluid and causes a vapor explosion of the fluid, resulting in cracking or chipping of the workpiece.

Figure 18:
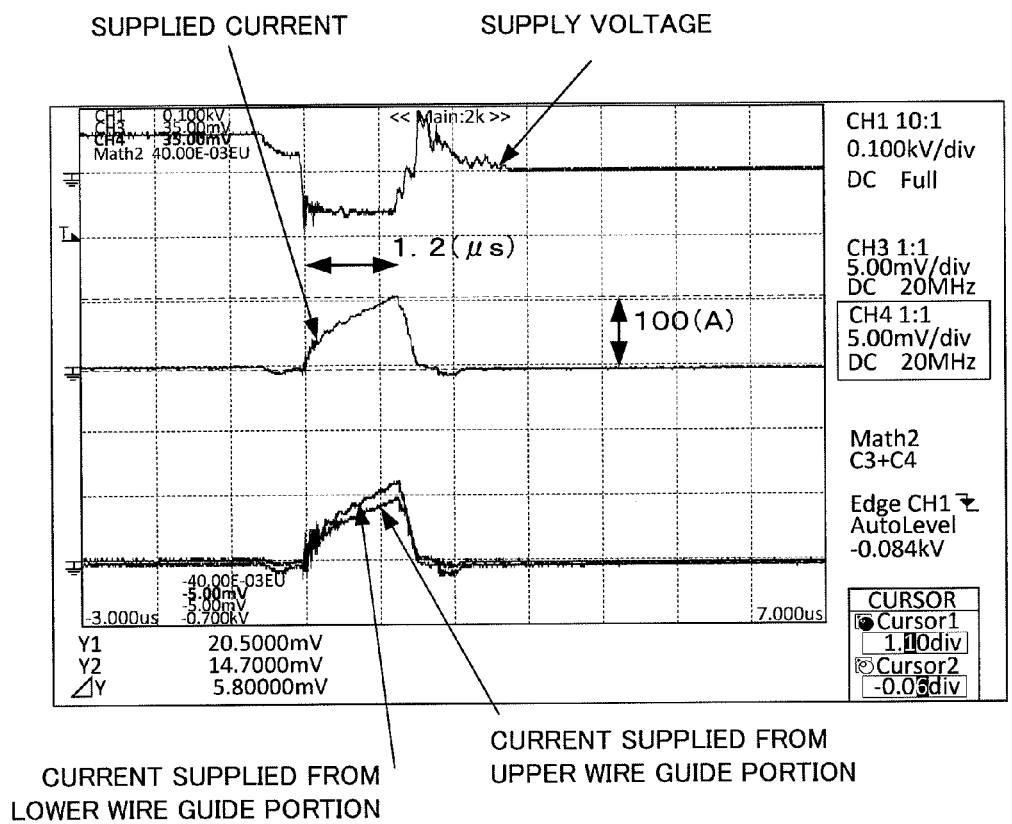
FIG. 18 is a diagram illustrating a conventional current waveform (peak current waveform) based on machining condition setting according to the present invention.
Figure 19A:
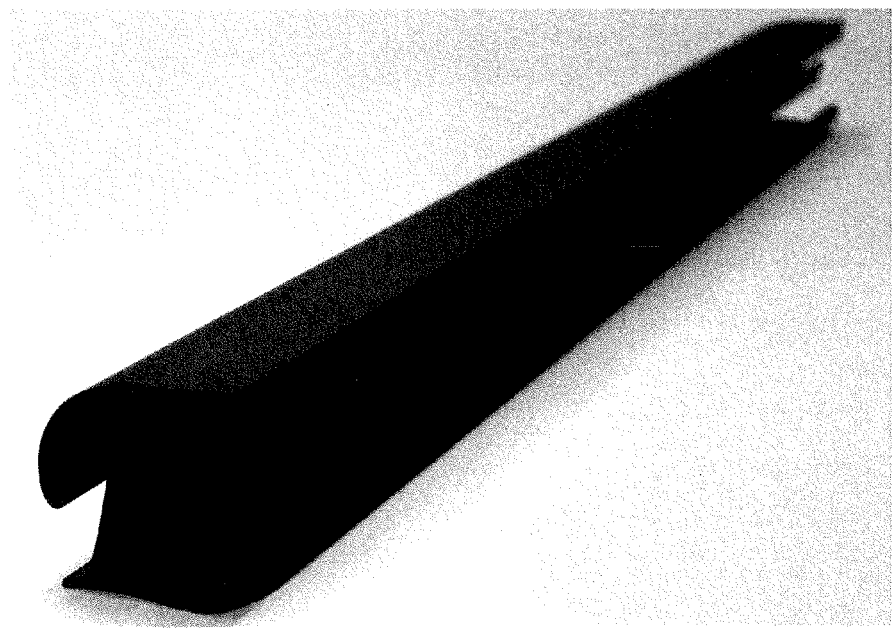
FIGS. 19A and 19B are diagrams showing a machining example in which a workpiece with a plate thickness of 150 mm is machined to a rib width of 0.6 mm with a peak current of 100 amperes.
Figure 19B:
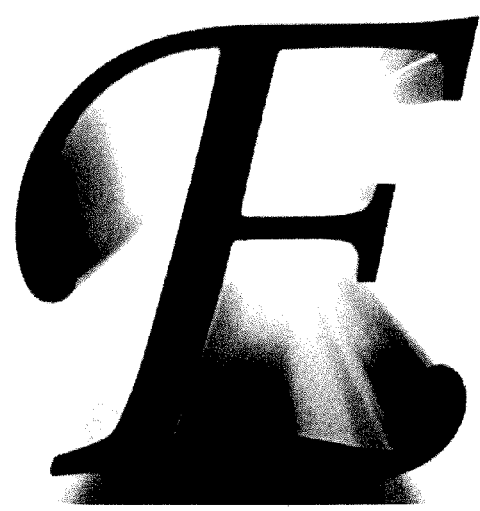

In machining condition setting of the present invention, in contrast, the peak current slowly rises up to 100 amperes, about a third of the conventional value, in 1.2 microseconds, twice the conventional required time, as shown in FIG. 18. In this case, no vapor explosion occurs in a deep part of the workpiece. Thus, as in an example shown in FIGS. 19A and 19B, a graphite workpiece with a plate thickness of 150 mm was able to be machined into the shape of a thin rib only 0.6 mm wide without cracking or chipping. FIGS. 19A and 19B are an external perspective view and a front view, respectively, of this machining example.

Figure 20A:
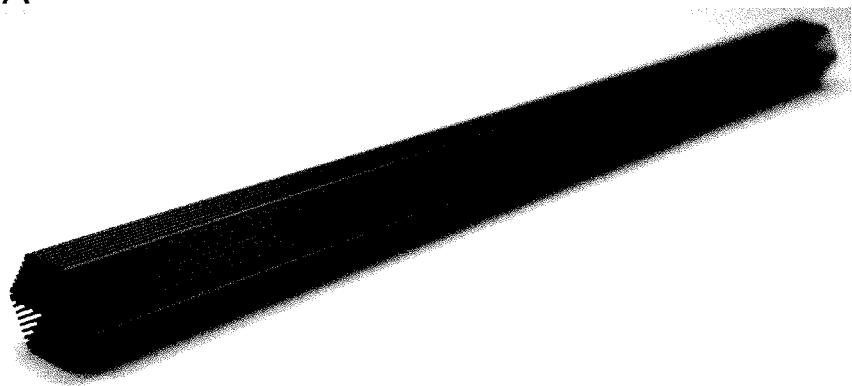
FIGS. 20A to 20D are diagrams showing a machining example in which a workpiece with a plate thickness of 150 mm is machined to a rib width of 0.3 mm with a peak current of 50 amperes.
Figure 20B:
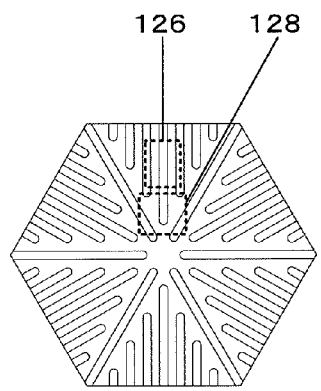
Figure 20C:
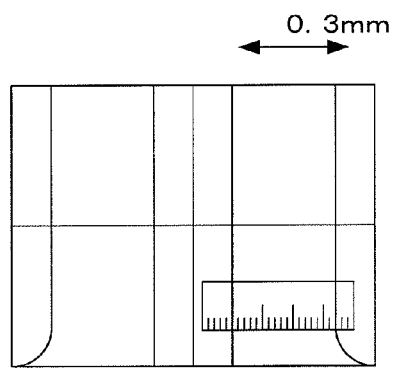
Figure 20D:
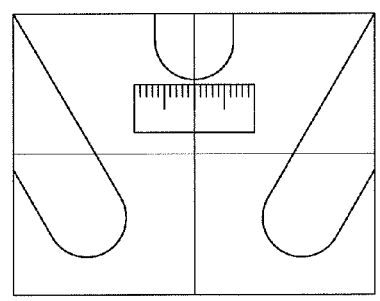
Figure 21:
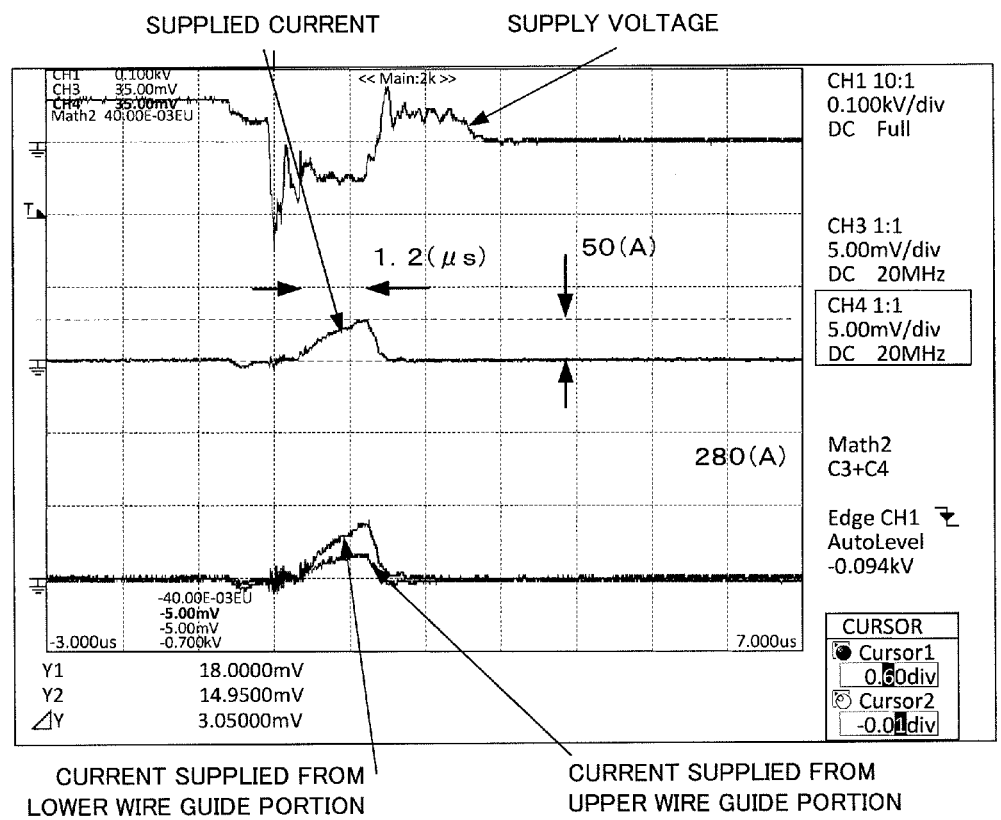
FIG. 21 is a diagram illustrating a current waveform for micromachining.

FIGS. 20A to 20D show a rib-like shape with a plate thickness of 150 mm and rib width of 0.3 mm. In order to further slow down the rise of the current, in this case, the peak current is set so that it rises up to 50 amperes, a sixth of the conventional value, in the same rise time of 1.2 microseconds, as shown in FIG. 21, thereby enabling machining free from cracking and chipping. If the current rise is slowed down as shown in FIG. 21, however, the current energy is reduced, so that the machining speed is inevitably reduced to about half that for the machining of the 0.6-mm-wide thin rib. FIGS. 20A and 20B are an external perspective view and a front view, respectively, of this machining example. FIGS. 20C and 20D are enlarged views of regions enclosed by broken lines 126 and 128, respectively, in FIG. 20B.

Figure 22:
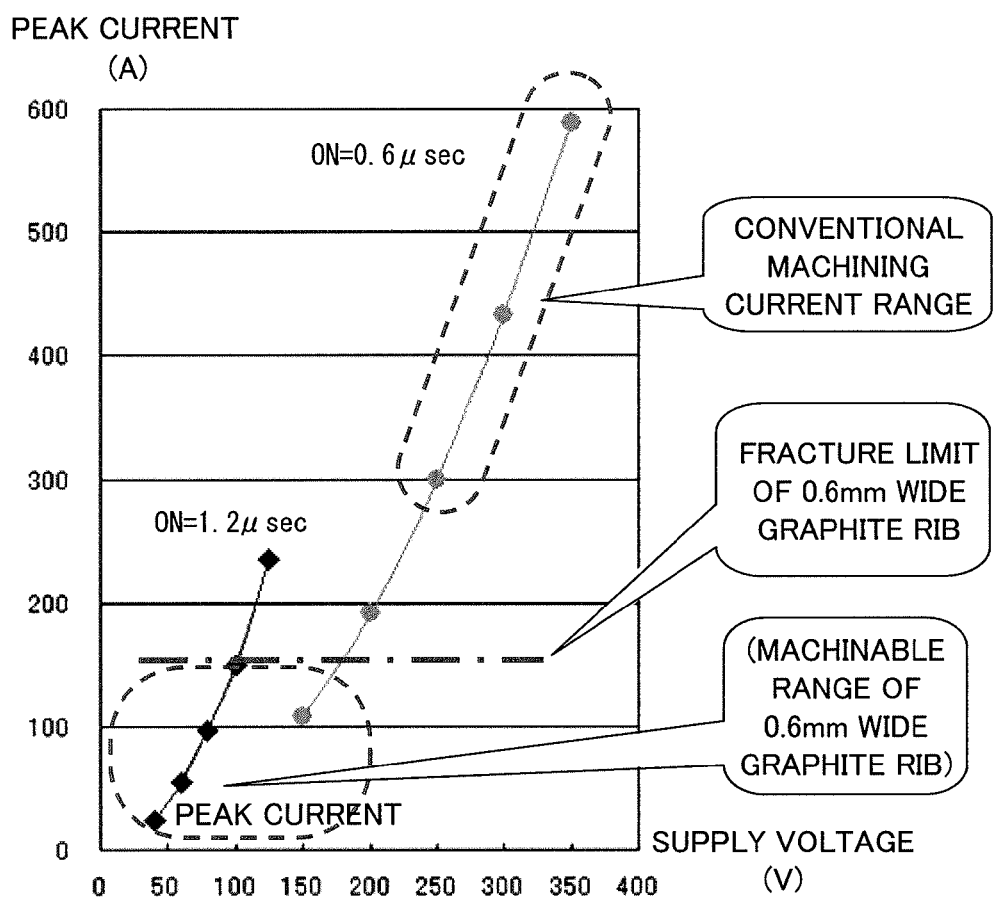
FIG. 22 is a graph illustrating a machinable range depending on the supply voltage and peak current.

FIG. 22 is a graph illustrating a machinable range based on the supply voltage and peak current and shows a range in which a 0.6-mm-wide graphite rib can be machined.

Figure 23:
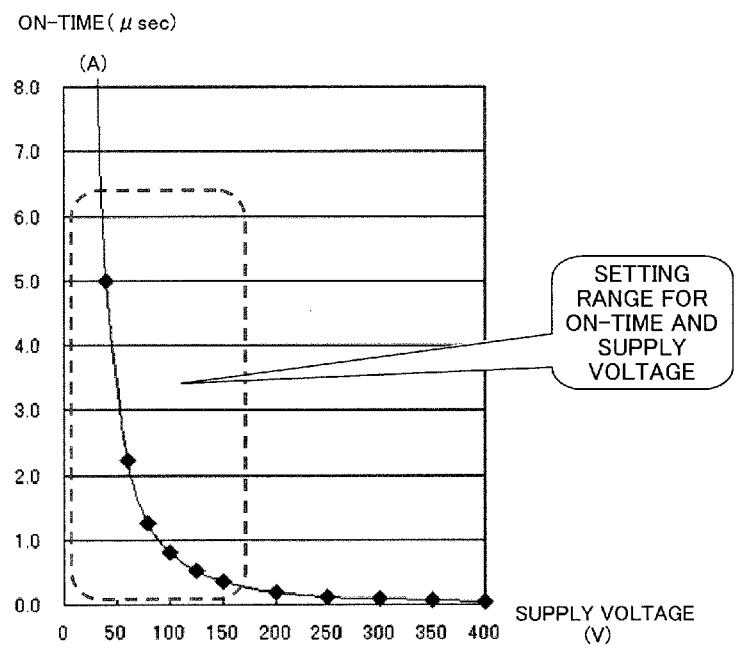
FIG. 23 is a graph illustrating the relationship between the on-time and supply voltage with the peak current at 100 amperes.

If the peak current value is set to 30 to 150 amperes, as shown in FIG. 22, the 0.6-mm-wide graphite rib cannot be broken. As shown in FIG. 22, moreover, the peak value of the conventional machining current is set to 300 to 600 amperes, much higher than the peak current value according to the present invention. Further, FIG. 23 is a graph illustrating the relationship between the on-time and supply voltage with the peak current at 100 amperes. The higher the supply voltage, the shorter the time required for the attainment of the peak current value of 100 amperes is.

Among other machining conditions, as illustrated in FIGS. 22 and 23, the discharge current pulse waveform, which influences the surface quality, cracking, and chipping of the workpiece, is set so that the peak current value ranges from, for example, 30 to 150 amperes, the current pulse width ranges from 0.3 to 6.4 microseconds, and no chipping occurs in connection with the current surface roughness and minimum rib width. Thus, in machining the graphite or carbon-composite workpiece, the surface quality and machining speed can be adjusted to values suitable for industrial use. An optimal peak current value, current pulse width, and quiescent time can be set by finally extending the quiescent time to such a degree that no wire breakage occurs.

A voltage is applied between the workpiece 2 and the wire electrode 1, and the graphite or carbon-composite workpiece 2 is machined by the wire electric discharge machine. In doing this, good surface quality and machining speed can be obtained by selecting such a machining supply voltage that the time required for the attainment of 90 amperes by the total discharge current flowing to the wire electrode 1 after the start of supply is 1.0 microsecond or more and that machining can be performed with a peak current value of 90 to 110 amperes.

In machining a thin rib-like shape with a rib width of 0.4 mm or less on the graphite or carbon-composite workpiece 2 with a voltage applied between the workpiece 2 and the wire electrode 1, moreover, good surface quality and machining speed can be obtained by machining in such a manner that the time required for the attainment of 40 amperes by the total discharge current flowing to the wire electrode 1 after the start of supply is 1.0 microsecond or more and that machining is performed with a peak current value of 40 to 70 amperes.

Figure 24:
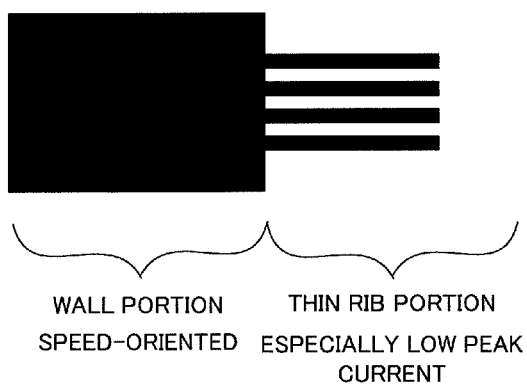
FIG. 24 is a diagram illustrating a method of machining a composite shape made of a thin rib and a wall.
Figure 25:
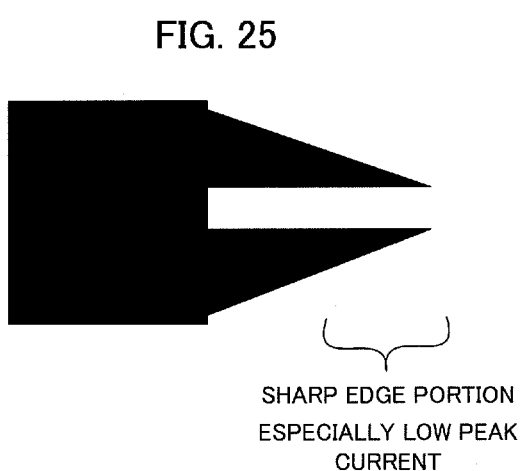
FIG. 25 is a diagram illustrating a method of machining a composite shape made of a sharp edge and a wall.

There are such cases where a thin rib-like portion is combined with a thick wall portion, depending on the machining shape, as shown in FIGS. 24 and 25. In these cases, the machining efficiency is higher in a case where the current is set for the double machining speed, as shown in FIG. 18, using the thick wall portion, which is free from cracking and chipping, than in a case where only the current waveform with the low peak current value, such as the one shown in FIG. 21, is used to be fit for the thin rib-like portion.

Thus, there are some methods to overcome some situations, as shown in (a) to (d) in FIG. 14. If there is no possibility of cracking or chipping, depending on the part of the machining shape, so that higher energy is required to maintain the priority of the machining speed, the on-time is extended with the supply voltage fixed to increase the peak current value. In this way, higher energy can be output, although the machined surface is damaged more seriously. If the highest priority is placed on the machining speed and requires more energy, there are two methods to overcome this. In one method, the supply voltage is increased correspondingly. In the other method, the supply voltage is reduced to maintain the priority of the machined surface quality, and the on-time is extended with the peak current unchanged. By doing this, the total energy is increased without increasing damage on the machined surface.

To change the current energy in accordance with the machining shape, there is a method in which commands to change energy settings (machining conditions) for variously shaped portions that require changes are added to the machining program. In shaping a sharp edge corner, for example, a sharp edge is identified based on an apex arrival signal obtained when the apex at a corner portion is reached and a joint angle to the next block, whereby energy is reduced to lessen edge chipping. Thus, the discharge energy should be instantaneously changed to an optimal value, so that a power supply device, such as the one shown in FIG. 13, is required.

The invention claimed is:

1. A wire electric discharge machine configured to apply a voltage to a machining gap between a wire electrode and a workpiece so that the workpiece is machined by electric discharge, the wire electric discharge machine comprising:

a power supply device for electric discharge machining comprising a plurality of DC power supply devices, supply voltage switching means for changing the plurality of DC power supply devices, and current supply means for turning on and off the supply of a discharge current to the machining gap from the DC power supply device changed by the supply voltage switching means; and a controller configured to control the supply voltage switching means and the current supply means of the power supply device for electric discharge machining, adjust the magnitude and the pulse width of a pulse voltage applied to the machining gap, and adjust a peak current value of a total discharge current flowing to the wire electrode and the current pulse width within ranges of 30 to 150 amperes and 0.3 to 6.4 microseconds, respectively, the wire electric discharge machine being configured, when the material of the workpiece is graphite or a carbon composite, to give a command from the controller to the supply voltage switching means, adjust the pulse voltage applied to the machining gap and the pulse width of the pulse voltage, give a command from the controller to the current supply means, set the peak current value of the total discharge current flowing to the wire electrode and the current pulse width so as to be suitable for machining of the graphite or carbon composite material, and perform the machining with a gentle rise of a machining current, the peak current value reduced, and the current pulse width increased.

2. The wire electric discharge machine according to claim 1, comprising material input means for inputting the material of the workpiece, wherein the controller adjusts the peak current value and the current pulse width for the power supply device for electric discharge machining within the respective change ranges of the peak current value and the current pulse width when the material of the workpiece input by the material input means is the graphite or carbon composite material.

3. A wire electric discharge machining method using a wire electric discharge machine configured to apply a voltage to a machining gap between a wire electrode and a workpiece so that the workpiece is machined by electric discharge, the wire electric discharge machine comprising:
 a power supply device for electric discharge machining comprising a plurality of DC power supply devices, supply voltage switching means for changing the plurality of DC power supply devices, and current supply means for turning on and off the supply of a discharge current to the machining gap from the DC power supply device changed by the supply voltage switching means; and
 a controller configured to control the supply voltage switching means and the current supply means of the power supply device for electric discharge machining, adjust the magnitude and the pulse width of a pulse voltage applied to the machining gap, and adjust a peak current value of a total discharge current flowing to the wire electrode and the current pulse width within the ranges of 30 to 150 amperes and 0.3 to 6.4 microseconds, respectively,
 wherein the workpiece of a graphite material or a carbon composite material is machined by the wire electric discharge machine for machining the workpiece by applying the voltage between the workpiece and the wire electrode, the peak current value of the total discharge current flowing to the wire electrode is set to any value within the range of 30 to 150 amperes, the current pulse width is set to any value within the range of 0.3 to 6.4 microseconds, and the machining is performed with a gentle rise of a machining current, the peak current value reduced, and the current pulse width increased.

4. A wire electric discharge machining method using a wire electric discharge machine configured to apply a voltage to a machining gap between a wire electrode and a workpiece so that the workpiece is machined by electric discharge, the wire electric discharge machine comprising:
 a power supply device for electric discharge machining comprising a plurality of DC power supply devices, supply voltage switching means for changing the plurality of DC power supply devices, and current supply means for turning on and off the supply of a discharge current to the machining gap from the DC power supply device changed by the supply voltage switching means; and
 a controller configured to control the supply voltage switching means and the current supply means of the power supply device for electric discharge machining, adjust the magnitude and the pulse width of a pulse voltage applied to the machining gap, and adjust a peak current value of a total discharge current flowing to the wire electrode and the current pulse width within the ranges of 30 to 150 amperes and 0.3 to 6.4 microseconds, respectively,
 wherein the workpiece of a graphite material or a carbon composite material is machined by the wire electric discharge machine for machining the workpiece by applying the voltage between the workpiece and the wire electrode, the time required for the attainment of 90 amperes by the value of the total discharge current flowing to the wire electrode after the start of supply is set to 1.0 microsecond or more, the peak current value is set to any value between 90 and 110 amperes, and the machining is performed with a gentle rise of a machining current, the peak current value reduced, and the current pulse width increased.

5. A wire electric discharge machining method using a wire electric discharge machine configured to apply a voltage to a machining gap between a wire electrode and a workpiece so that the workpiece is machined by electric discharge, the wire electric discharge machine comprising:
 a power supply device for electric discharge machining comprising a plurality of DC power supply devices, supply voltage switching means for changing the plurality of DC power supply devices, and current supply means for turning on and off the supply of a discharge current to the machining gap from the DC power supply device changed by the supply voltage switching means; and
 a controller configured to control the supply voltage switching means and the current supply means of the power supply device for electric discharge machining, adjust the magnitude and the pulse width of a pulse voltage applied to the machining gap, and adjust a peak current value of a total discharge current flowing to the wire electrode and the current pulse width within the ranges of 30 to 150 amperes and 0.3 to 6.4 microseconds, respectively,
 wherein the workpiece of a graphite material or a carbon composite material is machined by the wire electric discharge machine for machining the workpiece by applying the voltage between the workpiece and the wire electrode, the time required for the attainment of 40 amperes by the value of the total discharge current flowing to the wire electrode after the start of supply is set to 1.0 microsecond or more and the peak current value is set to any value between 40 and 70 amperes, when the machining shape is a thin rib-like shape with a rib width of 0.4 mm or less, and the machining is performed with a gentle rise of a machining current, the peak current value reduced, and the current pulse width increased.

* * * * *